No. 712,549. Patented Nov. 4, 1902.
G. E. KRAUSE & A. L. BOLEN.
MOTOR CONTROLLER.
(Application filed Oct. 7, 1901.)
(No Model.) 8 Sheets—Sheet 1.

WITNESSES:
Frank A. Fahle
Guy M. Ormston

INVENTORS
George E. Krause
Arthur L. Bolen
BY
Arthur M. Hood
ATTORNEY

No. 712,549. Patented Nov. 4, 1902.
G. E. KRAUSE & A. L. BOLEN.
MOTOR CONTROLLER.
(Application filed Oct. 7, 1901.)
(No Model.) 8 Sheets—Sheet 2.
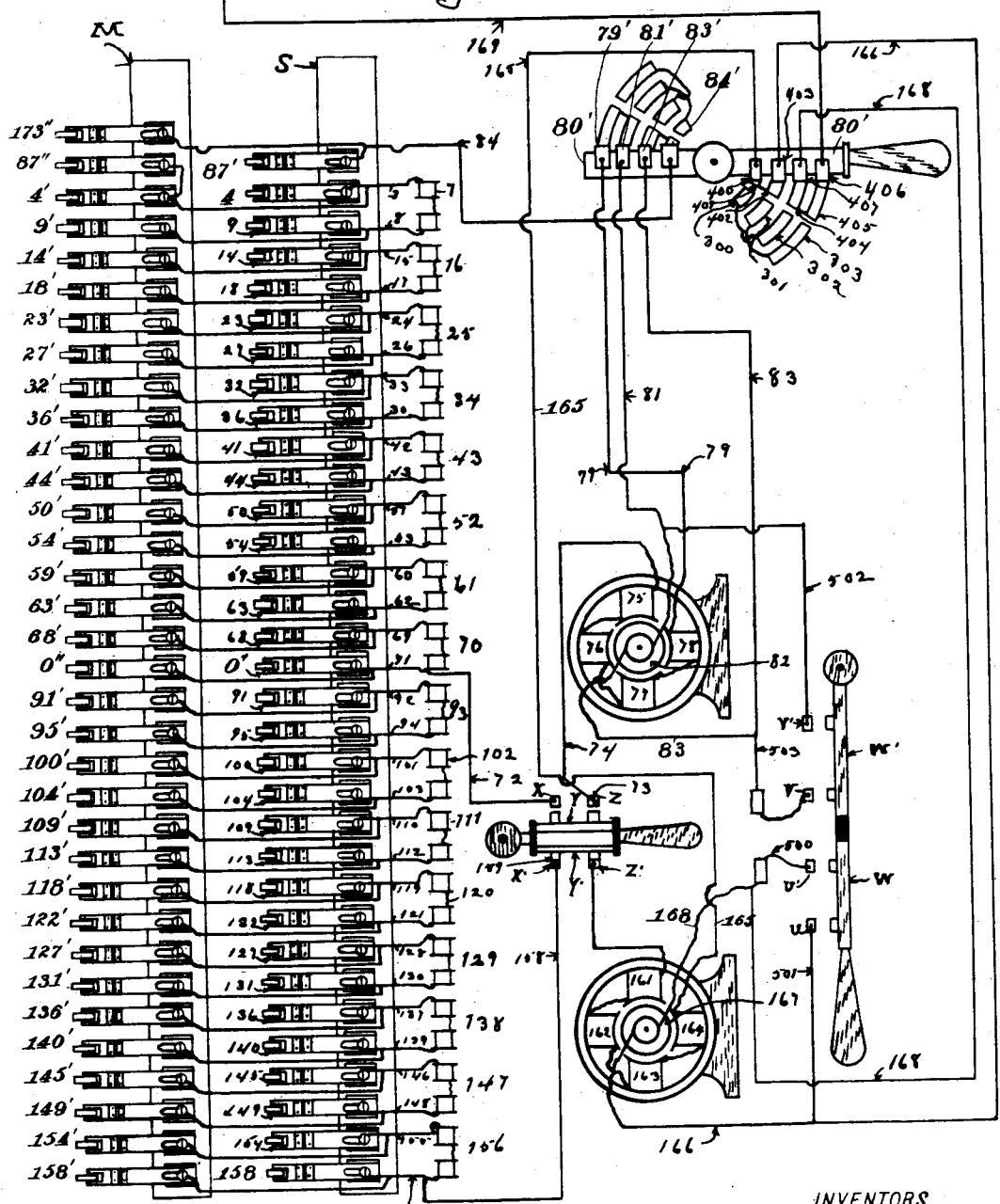
WITNESSES:
INVENTORS
George E. Krause.
Arthur L. Bolen.

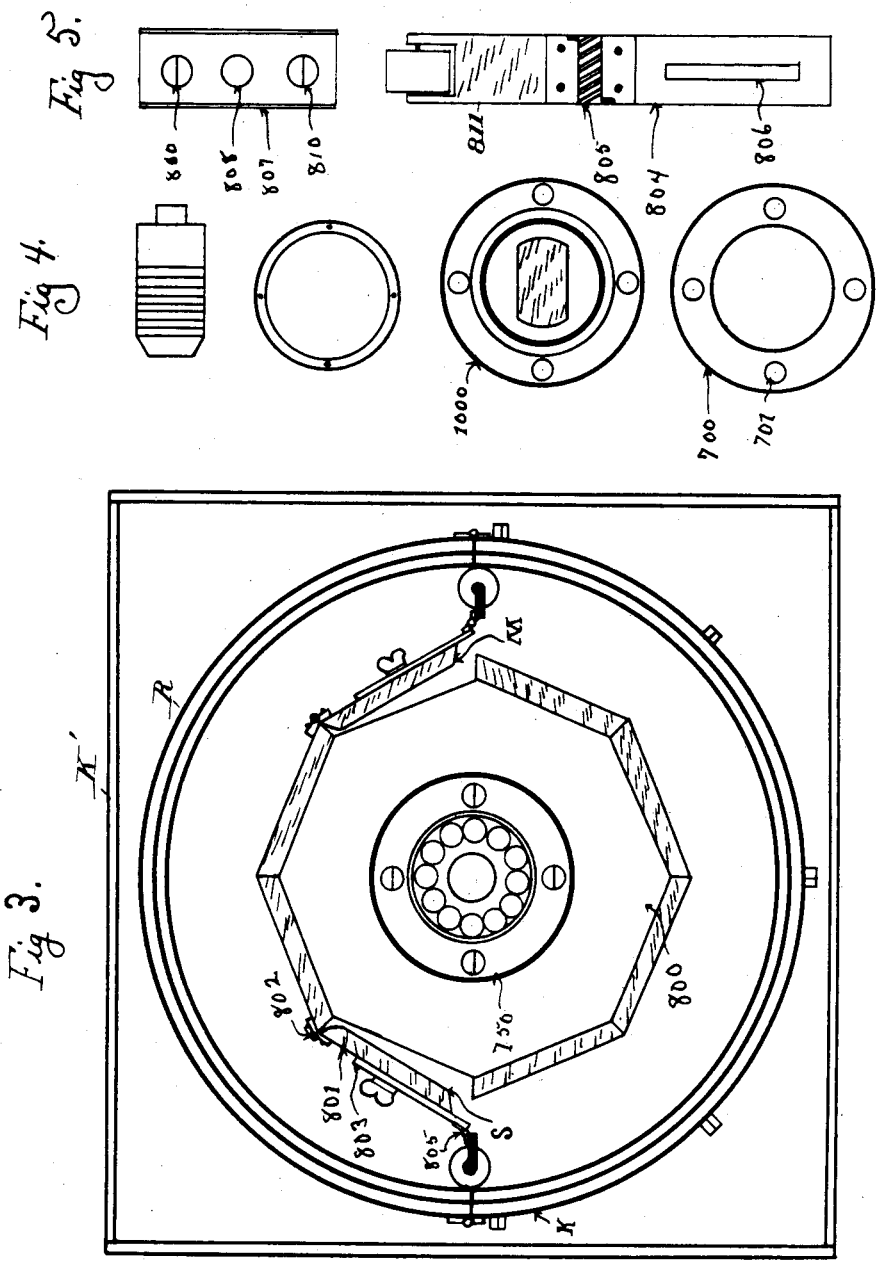

No. 712,549. Patented Nov. 4, 1902.
G. E. KRAUSE & A. L. BOLEN.
MOTOR CONTROLLER.
(Application filed Oct. 7, 1901.)
(No Model.) 8 Sheets—Sheet 4.
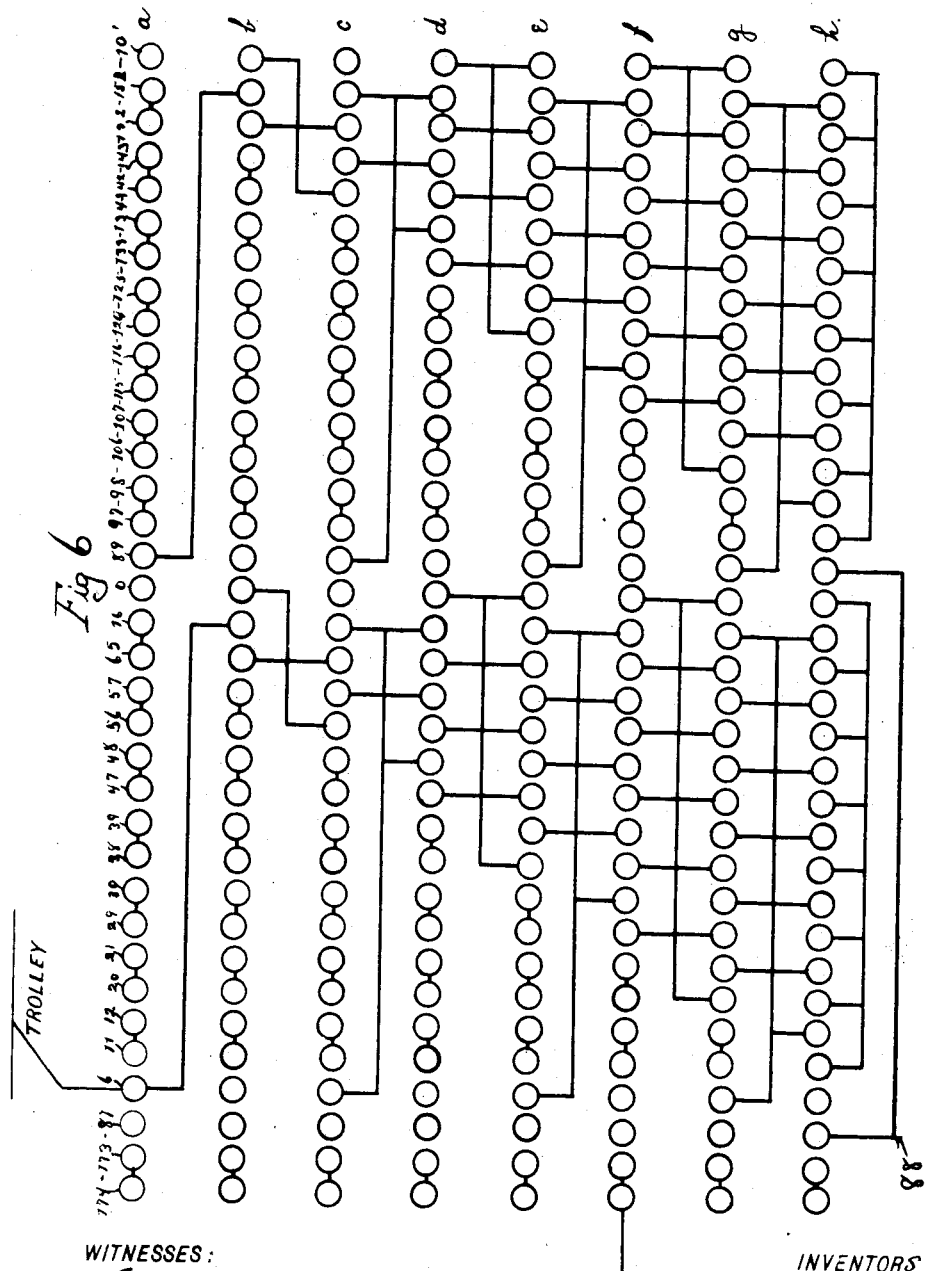
WITNESSES:
INVENTORS No. 712,549. Patented Nov. 4, 1902.
G. E. KRAUSE & A. L. BOLEN.
MOTOR CONTROLLER.
(Application filed Oct. 7, 1901.)

(No Model.) 8 Sheets—Sheet 5.

WITNESSES: INVENTORS

No. 712,549. Patented Nov. 4, 1902.
G. E. KRAUSE & A. L. BOLEN.
MOTOR CONTROLLER.
(Application filed Oct. 7, 1901.)

(No Model.) 8 Sheets—Sheet 6.

WITNESSES: INVENTORS
George E. Krause
Arthur L. Bolen.

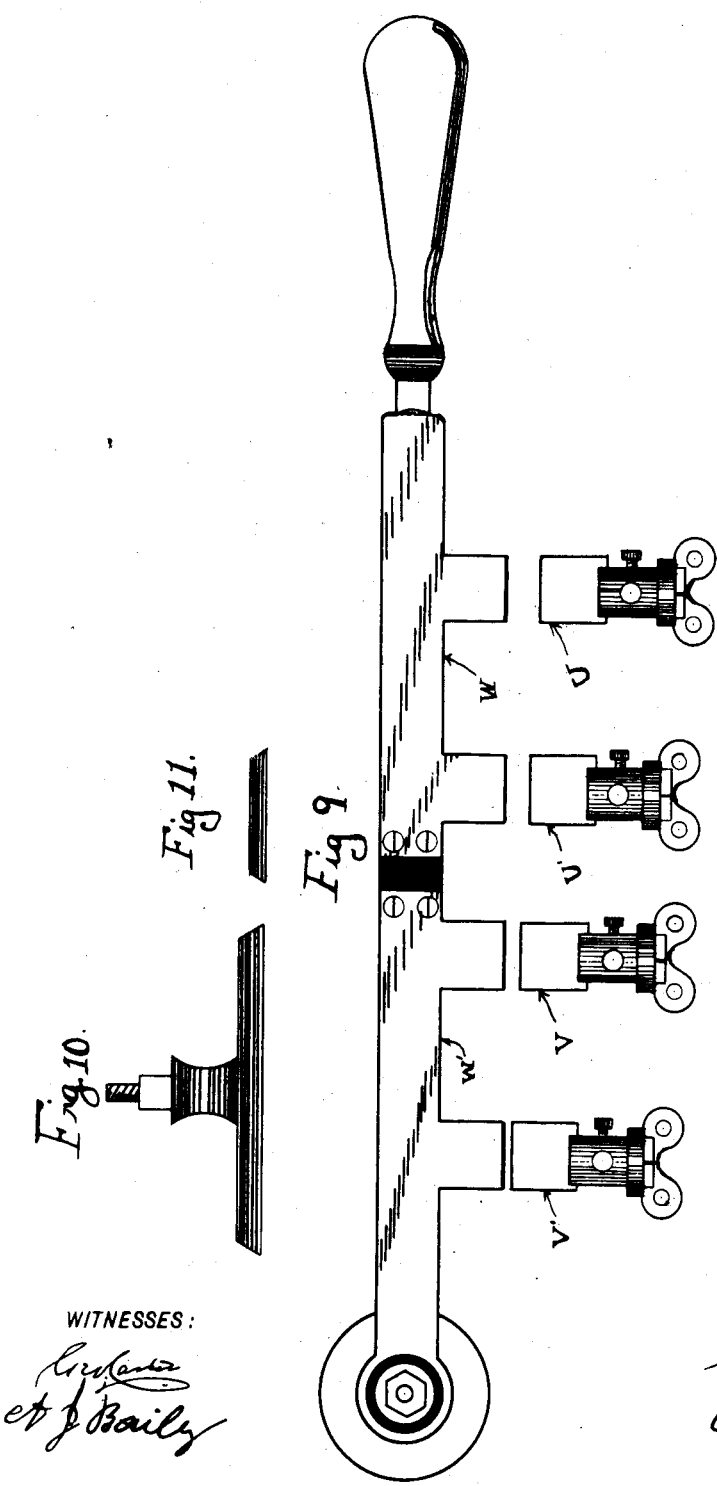

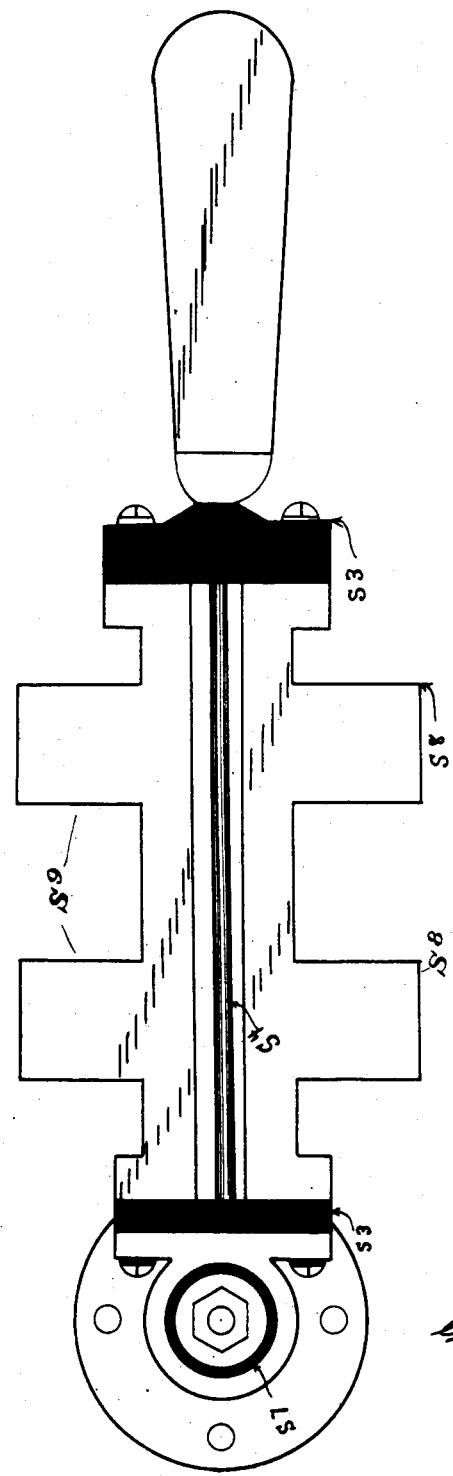

UNITED STATES PATENT OFFICE.

GEORGE E. KRAUSE AND ARTHUR L. BOLEN, OF INDIANAPOLIS, INDIANA.

MOTOR-CONTROLLER.

SPECIFICATION forming part of Letters Patent No. 712,549, dated November 4, 1902.

Application filed October 7, 1901. Serial No. 77,929. (No model.)

*To all whom it may concern:*

Be it known that we, GEORGE E. KRAUSE and ARTHUR L. BOLEN, of Indianapolis, county of Marion, and State of Indiana, have invented a certain new and useful Motor-Controller; and we do hereby declare that the following is a full, clear, and exact description thereof, reference being had to the accompanying drawings, in which like letters refer to like parts.

Our invention relates to an improved apparatus for and a system of varying the speed and direction of rotation of the armatures of electric motors.

The system consists of a plurality of fixed resistances, the connections therebetween and between the resistances and the armature being changed, so as to arrange them in series groups or multiple groups or series and multiple groups, or vice versa, and thereby increase or decrease the ampere-carrying capacity to the motor, all of the resistances being at any time in the circuit.

In carrying out our system we provide a movable or rotatable drum carrying a plurality of terminals which may be shifted into engagement with several series of stationary terminals, which in turn are bridged together in different groups to accomplish the desired result.

The system also involves the use of the motor as a brake, the rotation of the armature being retarded while the current remains in the machine-fields.

We have also provided a double motor-cut-out switch, so designed that only one motor can be cut out at a time.

The accompanying drawings illustrate our invention.

Figure 1:
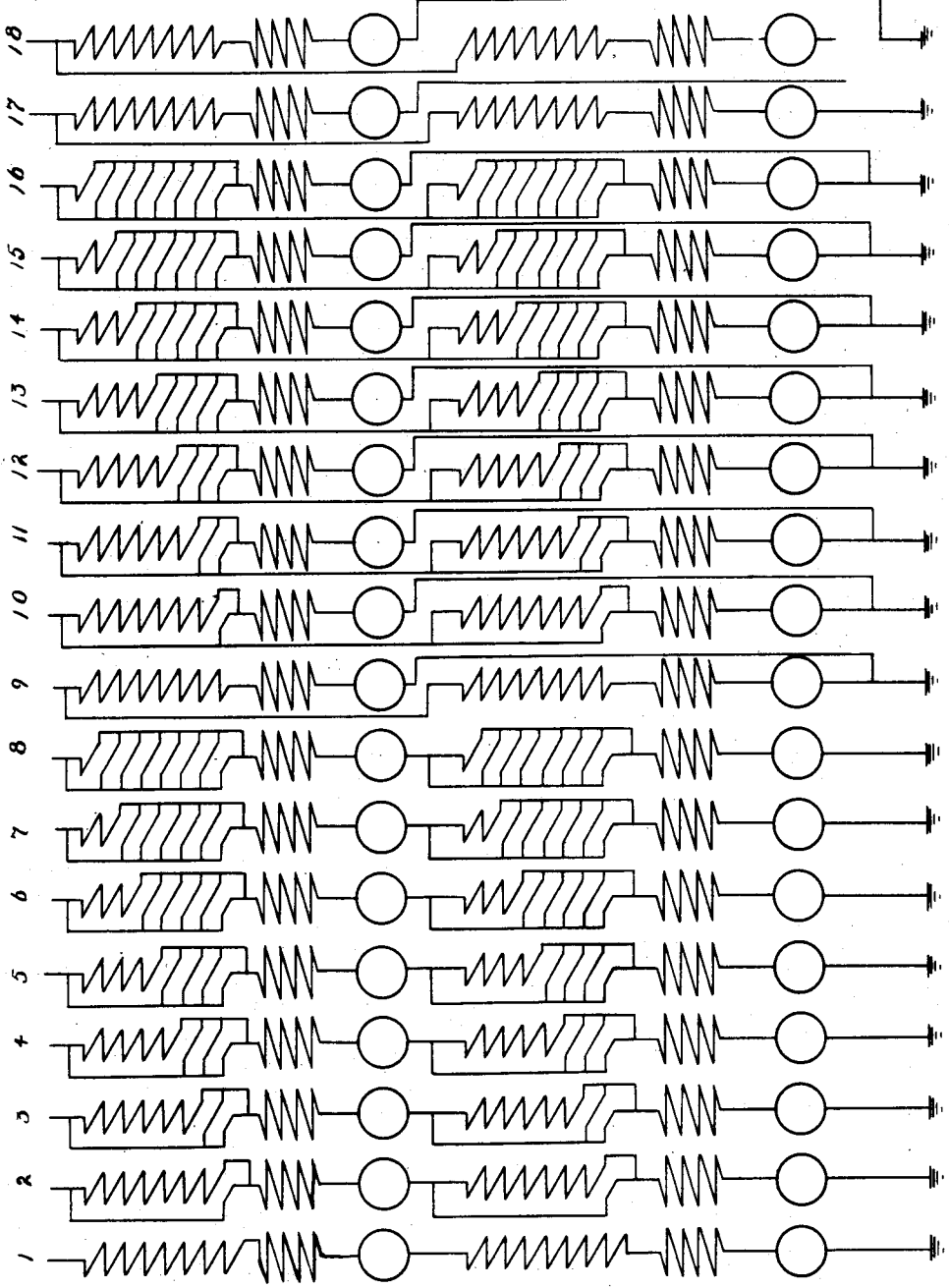
Figure 7:
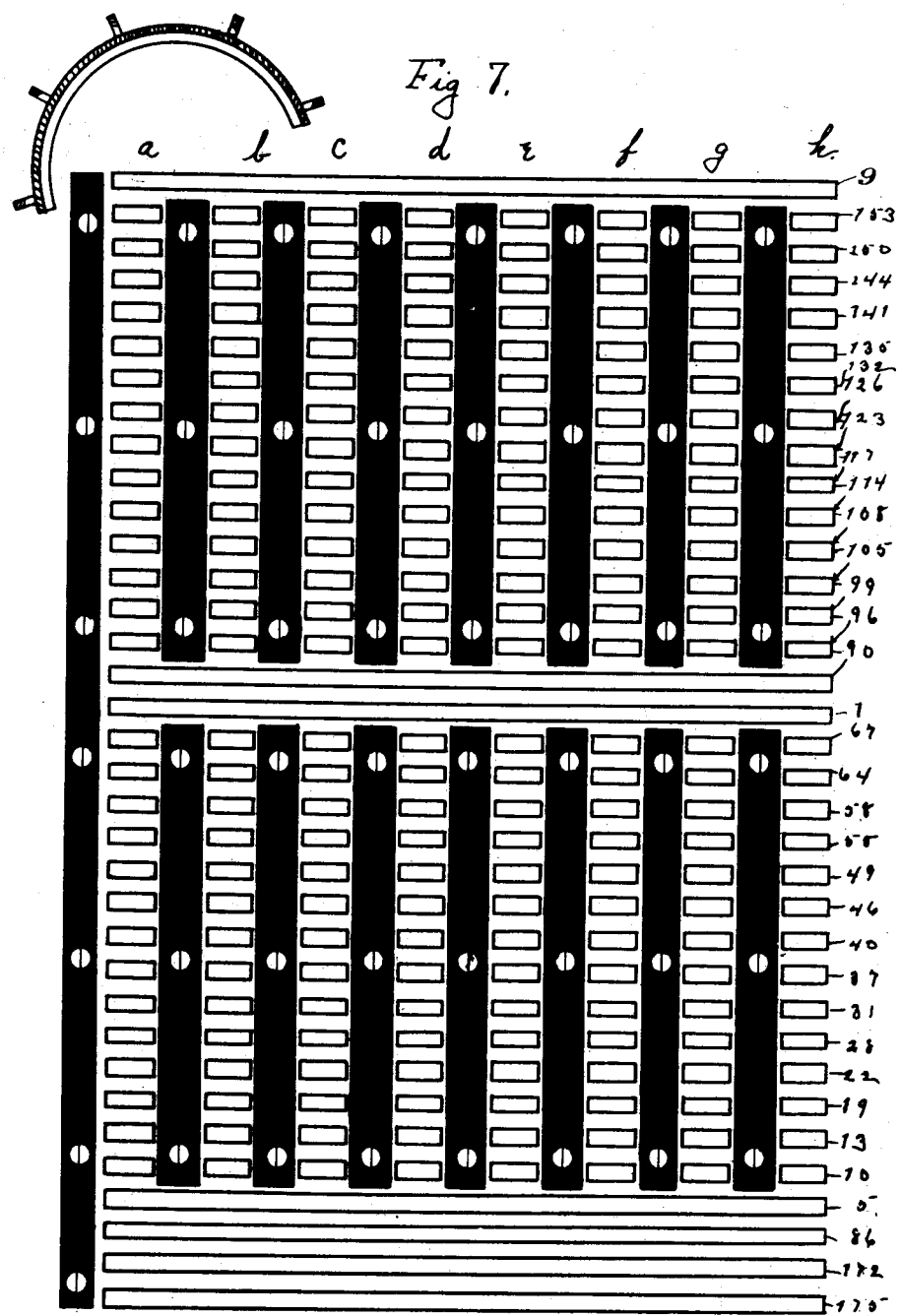
Figure 8:
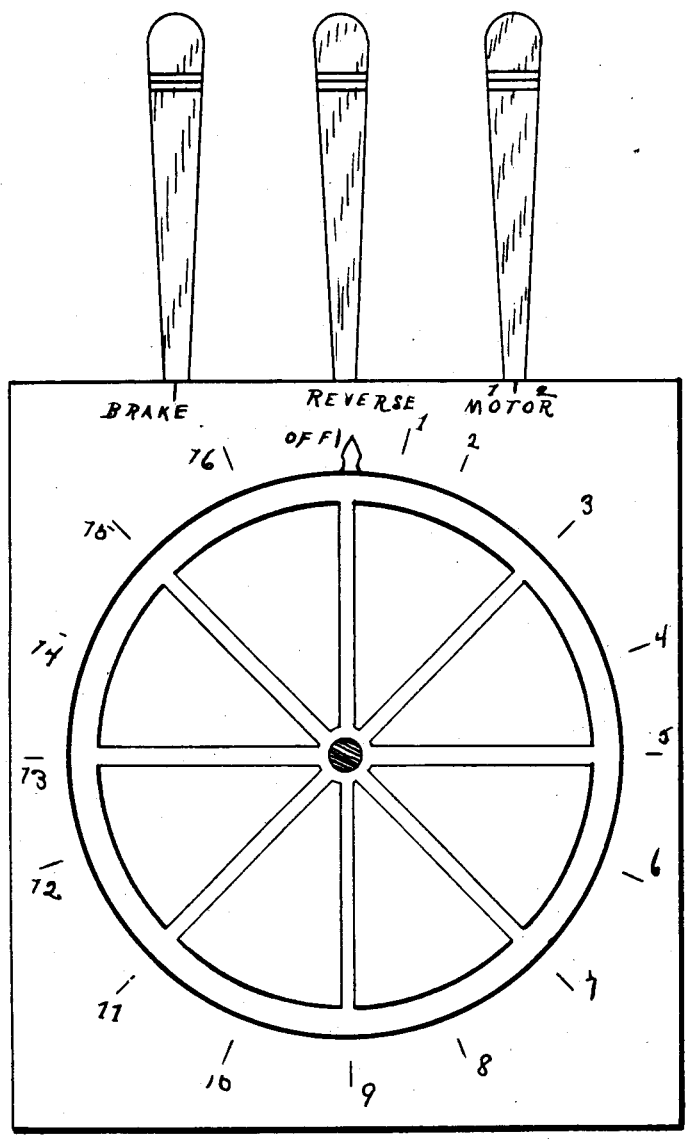

Figure 1 is a diagrammatical view showing the different combinations of resistances and motors which can be accomplished by shifting the drum in our apparatus to its different positions. Fig. 2 is a diagrammatic view showing the shifting terminal boards, rheostatic resistances, two motors, the motor-cut-out switch, the reversing-switch, the brake-switch, and wiring. Fig. 3 is a plan of the rotating drum and adjacent parts. Fig. 4 illustrates details of the bearing for the drum. Fig. 5 is a detail of one of the roller-terminals. Fig. 6 is a diagrammatical view showing the system of wiring on the back of the cylinder which coöperates with the drum. Fig. 7 is a development of the internal surfaces of one-half of the cylinder. Fig. 8 is a plan of the controller. Fig. 9 is a detail of the brake-switch. Figs. 10 and 11 are details of one of the plate-terminals on the inside of the drum. Fig. 12 is a plan of the motor-cut-out-switch plate.

In the drawings, $K'$ indicates a controller-box, within which is mounted a cylinder composed of two semicylindrical portions K and R, the interior of section R being formed of insulating material.

Arranged on the internal surfaces of section K is a plurality of terminal plates, which plates are arranged in vertical series $a$, $b$, $c$, $d$, $e$, $f$, $g$, and $h$, more or less, as may be desired, according to the number of resistances to be used, and in horizontal series 175, 172, 86, 5, 10, 13, 19, 22, 28, 31, 37, 40, 46, 49, 55, 58, 64, 69, 1, 90, 96, 99, 105, 108, 114, 117, 123, 126, 132, 135, 141, 144, 150, 153, and 9, beginning at the bottom of Fig. 7. Terminals 175, 172, 86, 1, 90, and 9 are, however, extended across the entire vertical series, so that each is a continuous plate, while the vertical series of the remaining terminals are separated by insulating-strips, as shown, which are brought to the same level as the terminals. Each of the small terminals is provided with a single pin and binding-post, which extends through the cylinder K, while each of the long terminals is provided with as many pins and binding-posts as there are vertical series of terminals, and the said binding-posts are arranged upon the back or outside of the cylinder K in vertical series $a\ b\ c\ d\ e\ f\ g\ h$, (see Fig. 6,) corresponding to the vertical series of terminals in Fig. 7, and in horizontal series 174, 173, 87, 6, 11, 12, 20, 21, 29, 30, 38, 39, 47, 48, 56, 57, 65, 16, 0, 89, 97, 98, 106, 107, 115, 116, 124, 125, 133, 134, 142, 143, 151, 152, 10'.

In row $a$, Fig. 6, suitable bridge-wires connect the following binding-posts in pairs: 174 173, 11 12, 20 21, 115 116, 124 125, 133 134, 142 143, 151 152. Terminal $a^6$ is connected to $b^{16}$ and $a^{89}$ with $b^{152}$.

In row $b$ the following terminals are bridged in pairs: 174 173, 11 12, 20 21, 29 30, 38 39, 47 48, 56 57, 97 98, 106 107, 115 116, 124 125, 133 134, and 142 143. Terminals $b^0$, $b^{65}$, $c^{65}$, and $c^{56}$ are bridged together, and terminals $b^{10'}$, $b^{151}$, $c^{151}$, and $c^{142}$ are connected.

In row $c$ the following terminals are bridged in pairs: 174 173, 11 12, 20 21, 29 30, 38 39, 47 48, 97 98, 106 107, 115 116, 124 125, and 133 134. Terminals $c^6$, $c^{57}$, and $c^{16}$ are bridged together and to $d^{48}$, $d^{57}$, and $d^{16}$, and terminals $c^{89}$, $c^{143}$, and $c^{152}$ are bridged together and to $d^{134}$, $d^{143}$, and $d^{151}$.

In row $d$ the following terminals are bridged together in pairs: 174 173, 11 12, 20 21, 29 30, 38 39, 97 98, 106 107, 115 116, 124 125. Terminals $d^{47}$, $d^{56}$, $d^{65}$, and $d^0$ are connected together and to $e^{38}$, $e^{47}$, $e^{56}$, $e^{65}$, and $e^0$, and $d^{133}$ $d^{142}$ $d^{151}$ $d^{10'}$ are bridged together and to $e^{124}$, $e^{133}$, $e^{142}$, $e^{151}$, and $e^{10'}$.

In row $e$ the following terminals are bridged together in pairs: 174 173, 11 12, 20 21, 29 30, 97 98, 106 107, 115 116. Terminals $e^6$, $e^{39}$, $e^{48}$, $e^{56}$, and $e^{16}$ are bridged together and to $f^{30}$ $f^{39}$ $f^{48}$ $f^{57}$ $f^{16}$, and $e^{89}$ $e^{125}$ $e^{134}$ $e^{143}$ $e^{152}$ are bridged together and to $f^{116}$, $f^{125}$, $f^{134}$, $f^{143}$, and $f^{152}$.

In row $f$ terminals 174 173, 11 12, 20 21, 97 98, 106 107 are bridged together in pairs, terminals $f^{29}$ $f^{38}$ $f^{47}$ $f^{56}$ $f^{65}$ $f^0$ are bridged together and to $g^{20}$, $g^{29}$, $g^{38}$, $g^{47}$, $g^{56}$, $g^{65}$, and $g^0$, and terminals $f^{115}$ $f^{124}$ $f^{133}$ $f^{142}$ $f^{151}$ $f^{10'}$ are bridged together and to $g^{106}$, $g^{115}$, $g^{124}$, $g^{133}$, $g^{142}$, $g^{151}$, and $g^{10'}$.

In row $g$ terminals 174 173, 11 12, 97 98 are bridged together in pairs, terminals $g^6$ $g^{20}$ $g^{30}$ $g^{39}$ $g^{48}$ $g^{57}$ $g^{16}$ are bridged together and to $h^{12}$, $h^{21}$, $h^{30}$, $h^{39}$, $h^{48}$, $h^{57}$, and $h^{16}$, and terminals $g^{89}$ $g^{107}$ $g^{116}$ $g^{125}$ $g^{134}$ $g^{143}$ $g^{152}$ are bridged together and to $h^{98}$ $h^{107}$ $h^{116}$ $h^{125}$ $h^{134}$ $h^{143}$ $h^{152}$.

In row $h$ terminals 174 173 and 87 89 are bridged together in pairs, terminals $h^{11}$, $h^{20}$, $h^{29}$, $h^{38}$, $h^{47}$, $h^{56}$, $h^{65}$, and $h^0$ are bridged together, and terminals $h^{97}$, $h^{106}$, $h^{115}$, $h^{124}$, $h^{133}$, $h^{142}$, $h^{151}$ and $h^{10'}$ are bridged together.

Turning now to Fig. 3, we mount inside of the cylinder formed by sections K and R a rotatable drum 800, which carries at opposite sides two terminal boards M and S, each of which is spring-hinged at 802 on a vertical axis to the drum 800. Secured to each terminal board is a plurality of terminal plates 803, each provided with a slot 806 and fastened to the board, so as to be radially adjustable thereon. Each board 803 carries at its outer end a spring-hinge 805, to which is secured a contact-roller. Each of the terminals thus formed will be hereinafter designated by a separate numeral.

Turning now to Fig. 2, which shows the terminal boards M and S with the attached terminals diagrammatically, beginning at the top of board S, which corresponds with the bottom of Figs. 6 and 7, we provide a series of roller-terminals 87' 4 9 14 18 23 27 32 36 41 44 50 54 59 63 68 0' 91 95 100 104 109 113 118 122 127 133 136 140 145 149 154 158. Mounted within the drum 800 is a plurality of resistances 7, 16, 25, 34, 43, 52, 61, 70, 93, 102, 111, 120, 129, 138, 147, and 156. Resistance 7 is bridged in between terminal rollers 4 and 9 by wires 3 and 8, respectively, resistance 16 between rollers 14 and 18 by wires 15 and 17, resistance 25 between rollers 23 and 27 by wires 24 and 26, resistance 34 between rollers 32 and 36 by wires 33 and 35, resistance 43 between rollers 41 and 44 by wires 42 and 43', resistance 52 between rollers 50 and 54 by wires 51 and 53, resistance 61 between rollers 59 and 63 by wires 60 and 62, resistance 70 between rollers 68 and 0' by wires 69 and 71, resistance 93 between rollers 91 and 95 by wires 92 and 94, resistance 102 between rollers 100 and 104 by wires 101 and 103, resistance 111 between rollers 109 and 113 by wires 110 and 112, resistance 120 between rollers 118 and 122 by wires 119 and 121, resistance 129 between rollers 127 and 131 by wires 128 and 130, resistance 138 between rollers 136 and 140 by wires 137 and 139, resistance 147 between rollers 145 and 149 by wires 146 and 148, resistance 156 between rollers 154 and 158 by wires 155 and 157.

Terminal board M is provided with terminal rollers 173" 87" 4' 9 14' 18' 23' 27' 32' 36' 41' 44' 50' 54' 59' 63' 68' 0" 91' 95' 100' 104' 109' 113' 118' 122" 127' 131' 136' 140' 145' 149' 158' corresponding to the terminal rollers having similar numbers of board S. Roller 173" is connected by wire to roller 87' and rollers 4', 9', 14', 18', 23', 27', 32', 36', 41', 44', 50', 54', 59', 63', 68', 0", 91', 95', 100', 104', 109', 113', 118', 122', 127', 131', 139', 140', 145', 149', 154', and 158' are respectively connected to wires 3, 8, 15, 17, 24, 26, 33, 35, 42, 43', 51, 53, 60, 62, 69, 71, 92, 94, 101, 103, 110, 112, 119, 121, 128, 130, 137, 139, 146, 148, 155, and 157. Roller 87" is bridged to roller 4'.

The motor-cut-out switch shown in Figs. 12 and 2 consists of a pivoted head $S^7$, which carries a pair of switch-plates $S^8$ and $S^9$, said plates being insulated from each other by suitable insulating-strips $S^3$. A suitable operating-handle is secured to head $S^7$ by means of a bar $S^4$, which lies between the two switch-plates. Arranged in position to receive the fingers of plate $S^8$ are terminals X' and Z', while similar terminals X and Z are arranged to receive the fingers of plates $S^9$, the spaces between the two pairs of terminals being such that by swinging the switch-plate $S^4$ upon its pivot either pair of fingers may be withdrawn from engagement with their coöperating terminals, but such that one or the other pair of fingers will always be in engagement with the coöperating terminals. When the switch is in its medial position, both plates are in engagement with their respective terminals.

The reverse-switch 80 consists of a pair of oppositely-extending arms 80' and 80", of insulating material. Arm 80' carries four terminals 400 403 406 407 and arranged in position to be engaged by said terminals are terminals 401 402 404 405 respectively, terminals 401 and 402 being bridged and terminals 404 and 405 being bridged. Also arranged to be engaged by terminals 400, 403, 407, and 406, respectively, are terminals 300, 301, 302, and 303, respectively, terminals 300 302 and 301 303 being bridged in pairs. Arm 80″ carries four terminals 79′, 81′, 83′, and 84′, proper reversing-terminals being arranged to be engaged by said terminals, as shown in the upper right-hand corner of Fig. 2.

In Fig. 7 terminals 5 and 90 are connected through the back of the cylinder with a trolley or other positive feeder-line, while terminals 172, 1, and 9 are grounded or connected to the negative feeder.

In Fig. 1 we have shown sixteen different groupings of the resistances 7 16 25, &c., (shown in Fig. 2,) and the field-coils and armatures of both motors. Each resistance-coil is indicated by a short oblique line, the field by a zigzag line F, and the armature of each motor indicated at A. Grouping 1 in Fig. 1 is obtained when drum 800 is shifted so as to bring the roller-terminals of board S into engagement with row $a$ of the terminals shown in Fig. 7, and in this grouping the two motors are arranged in series, each motor having half the resistance in series with it, the circuit being as follows: For this group switch $S^7$ is brought to its medial position, so as to connect terminals X Z and X′ Z′; from the feeder to terminal $a^6$, thence to plate 5, to roller 4, Fig. 2, (in tracing the circuits further we will pass in succession from Fig. 2 to Fig. 7, thence to Fig. 6, thence to Fig. 7, thence to Fig. 2, &c;) from roller 4 through 3, 7, 8, 9, $a^{10}$, $a^{11}$, $a^{12}$, $a^{13}$, 14, 15, 16, 17, 18, $a^{19}$, $a^{20}$, $a^{21}$, $a^{22}$, 23, 24, 25, 26, 27, $a^{28}$, $a^{29}$, $a^{30}$, $a^{31}$, 32, 33, 34, 35, 36, $a^{37}$, $a^{38}$, $a^{39}$, $a^{40}$, 41, 42, 43, 43′, 44, $a^{46}$, $a^{47}$, $a^{48}$, $a^{49}$, 50, 51, 52, 53, 54, $a^{55}$, $a^{56}$, $a^{57}$, $a^{58}$, 59, 60, 61, 62, 63, $a^{64}$, $a^{65}$, $a^{16}$, $a^{67}$, 68, 69, 70, 71, 72, X, $S^9$, Z, 74, field-coils 75, 76, 77, 78, wire 79, 79′, 81′, 81, armature 82, wire 83, 83′, 84′, 84, 87′, 86, Fig. 7, 87, wire 88, Fig. 6, 89, 90, 91, 92, 93, 94, 95, $a^{96}$, $a^{97}$, $a^{98}$, $a^{99}$, 100, 101, 102, 103, 104, $a^{105}$, $a^{106}$, $a^{107}$, $a^{108}$, 109, 110, 111, 112, 113, $a^{114}$, $a^{115}$, $a^{116}$, $a^{117}$, 118, 119, 120, 121, 122, $a^{123}$, $a^{124}$, $a^{125}$, $a^{126}$, 127, 128, 129, 130, 131, $a^{132}$, $a^{133}$, $a^{134}$, $a^{135}$, 136, 137, 138, 139, 140, $a^{141}$, $a^{142}$, $a^{143}$, $a^{144}$, 145, 146, 147, 148, 149, $a^{150}$, $a^{151}$, $a^{152}$, $a^{153}$, 154, 155, 156, 157, wire 158′, terminals X′ Z′, field-coils 161, 162, 163, 164, wire 165, terminals 400, 401, 402, 403, wire 166, armature 167, wire 168, reverse-switch terminals 407, 404, 405, 406, wire 169, to post 173, and to ground or negative feeder.

By shifting drum 800 so as to bring the rollers of board S into engagement with the terminals of set $b$, Fig. 7, group 2 of Fig. 1 would be produced through the following circuit: beginning with the feeder attached to the terminal 6, passing from thence through roller 4, 3, 7, 8, 9, $b^{10}$, $b^{11}$, $b^{12}$, $b^{13}$, 14, 15, 16, 17, 18, $b^{19}$, $b^{20}$, $b^{21}$, $b^{22}$, 23, 24, 25, 26, 27, $b^{28}$, $b^{29}$, $b^{30}$, $b^{31}$, 32, 33, 34, 35, 36, $b^{37}$, $b^{38}$, $b^{39}$, $b^{40}$, 41, 42, 43, 44, $b^{46}$, $b^{47}$, $b^{48}$, $b^{49}$, 50, 51, 52, 53, 54, $b^{55}$, $b^{56}$, $b^{57}$, $b^{58}$, 59, 60, 61, 62, 63, $b^{64}$, $b^{65}$, thence through the bridging-wire to $b^0$, terminal 1, roller 0′, 71, 72. At the same time the current passes from $b^6$ to 5, $a^6$, through the bridging-wire, Fig. 6, to $b^{16}$, $b^{67}$, 68, 69, 70, 71, 72, and from thence through the cut-out switch, the first motor, and the reversing-switch to wire 84, as in group 1, and from thence through 87′, 86, 87, wire 88, Fig. 6, 89, 90, 91, 92, 93, 94, 95, $b^{96}$, $b^{97}$, $b^{98}$, $b^{99}$, &c., as in group 1, to $b^{151}$, from whence it passes through the bridging-wire to $b^{10}$, and from thence to terminal 9 and through roller 158, wire 157, 158′, through the cut-out switch, the second motor, the reversing-switch, and wire 169 to the terminal 174, as in group 1. By this arrangement resistances 7, 16, 25, 34, 43, 52, and 61 are in series, resistance 70 is paralleled therewith, and all are in series with the first motor, and a similar arrangement of the main resistances is made with the second motor, resistance 156 being parallel with the remaining resistances in series.

By shifting drum 800 so as to bring the rollers of terminal board 7 into contact with set $c$ of terminals the arrangement of resistances shown in group 3 of Fig. 1 is produced by the establishment of the following circuit: beginning with $c^6$ and passing through 5, 4, 3, 7, 8, 9, $c^{10}$, $c^{11}$, $c^{12}$, $c^{13}$, 14, 15, 16, 17, 18, $c^{19}$, $c^{20}$, $c^{21}$, $c^{22}$, 23, 24, 25, 26, 27, $c^{28}$, $c^{29}$, $c^{30}$, $c^{31}$, 32, 33, 34, 35, 36, $c^{37}$, $c^{38}$, $c^{39}$, $c^{40}$, 41, 42, 43, 43′, 44, $c^{46}$, $c^{47}$, $c^{48}$, $c^{49}$, 50, 51, 52, 53, 54, $c^{55}$, $c^{56}$, and from thence, Fig. 6, to $b^0$, 1, 0′, 71, 72. At the same time we pass from $c^6$ over the bridging-wire to $c^{57}$ and $c^{16}$, two parallel circuits being established, as follows: $c^{57}$, $c^{58}$, 59, 60, 61, 62, 63, $c^{64}$, $c^{65}$, from thence bridged to $b^0$, 1, 0′, 71, 72, and $c^{16}$, $c^{67}$, 68, 69, 70, 71, 72, and from thence through the motor cut-out switch and the first motor, as in the preceding groups. In this grouping resistances 7, 16, 25, 34, 43, and 52 are in series, while resistances 61 and 70 are parallel therewith, these resistances being in series circuit with the first motor. A similar grouping of the remaining resistances in circuit with the set motor is also produced, as will now be readily apparent.

By shifting drum 800 so as to bring the rollers of board S into successive engagement with sets $d$, $p$, $f$, $g$, and $h$ the arrangement of resistances may be varied, as indicated in diagrams 4, 5, 6, 7, and 8, Fig. 1, the two motors in each case being in series. By a further movement of drum 800 the rollers of terminal board M may be brought into engagement with set $a$ of the terminals shown in Fig. 7. By this arrangement the motors are paralleled, half of the resistances being in series circuit with each motor, as indicated in group 9 of Fig. 1, the following circuits being established: from $a^6$ to 5, 4′, 3, 7, 8, 9′, $a^{10}$, $a^{11}$, $a^{12}$, $a^{13}$, 14′, 15, 16, 17, 18′, $a^{19}$, $a^{20}$, $a^{21}$, $a^{22}$, 23′, 24, 25, 26, 27′, $a^{28}$, $a^{29}$, $a^{30}$, $a^{31}$, 32′, 33, 34, 35, 36′, $a^{37}$, $a^{38}$, $a^{39}$, $a^{40}$, 41′, 42, 43, 43′, 44′, $a^{46}$, $a^{47}$, $a^{48}$, $a^{49}$, 50′, 51, 52, 53, 54′, $a^{55}$, $a^{56}$, $a^{57}$, $a^{58}$, 59′, 60, 61, 62, 63′, $a^{64}$, $a^{65}$, $a^{16}$, $a^{67}$, 68′, 69, 70, 71, 72, X, $S^9$, Z, 74, 75, 76, 77, 78, 79, 79′, 81′, 81, 82, 83, 83′, 84′, 84, 173″, 173 to ground or negative feeder. At the same time a parallel circuit is established, beginning at $a^6$, through 5, roller 4′, roller 87″, terminal 86, 87, bridge-wire 88 to $89^h$, thence to terminal 90, thence through 91, 92, 93, 94, 95, $a^{96}$, $a^{97}$, $a^{98}$, $a^{99}$, 100, 101, 102, &c., in series through the resistances 129, 138, 147, 156, and thence through the motor cut-out switch, the second motor, the reversing-switch, through wire 169 to 173, and ground, as group 1. By shifting the drum so as to bring the rollers of board M successively into engagement with the sets of terminals $b$, $c$, $d$, $e$, $f$, $g$, and $h$ the combinations indicated in groups 10 to 16, inclusive, of Fig. 1 may be produced, as is readily apparent, in the same manner as with the rollers of terminal board S. Groups 600 and 601 of Fig. 1 indicate the condition when the motor cut-out switch is thrown so as to cut out one or the other of the motors.

The motor brake-switch consists of two insulated portions W and W', which are preferably hinged upon a common center, portion W being adapted to be drawn into engagement with a pair of terminals U and U', while portion W' may be brought into simultaneous engagement with terminals V and V'. Terminal U is connected by wire 501 to wire 166, U' by wire 500 to wire 168, V by wire 503 with wire 83, and V' by wire 502 to wire 81. By swinging the brake-switch W W' into engagement with their respective terminals a short circuit is formed from wire 81 over wire 502, terminal V', switch W', terminal V, and wire 503, so as to cut out armature 82 of the first motor, but leaving the current in the feed-coils thereof, and similarly armature 167 is cut out by a short circuit formed between wires 166 and 168 by wire 501, terminal U, switch W, terminal U', and wire 500.

We claim as our invention—

1. In a motor-controller, the combination with a plurality of electrical resistances forming part of the motor-circuit, of a pair of terminals for each of said resistances, and means for changing bridging connections between said terminals whereby the resistances may be placed in series or any number of said resistances placed in parallel with the remaining series-arranged resistances.

2. In a motor-controller, the combination with a plurality of electrical resistances forming part of the motor-circuit, of a pair of terminals for each of said resistances, and a single means for changing the bridging connections between said terminals whereby the resistances may be placed in series or any number of said resistances in parallel with the remaining series-arranged resistances.

3. In a motor-controller, the combination with a pair of motors, of two sets of electrical resistances, connections arranging each set of resistances in series with its motor and the motors in series, a pair of terminals for each of said resistances, and means for changing bridging connections between said terminals whereby the resistances for each motor may be placed in series or any number of said resistances placed in parallel with the remaining series-arranged resistances.

4. In a motor-controller, the combination with a pair of motors, of two sets of electrical resistances, connections arranging each set of resistances in series with its motor and the motors in series, a pair of terminals for each of said resistances, and a single means for changing bridging connections between said terminals whereby the resistances of each motor may be placed in series or any number of said resistances placed in parallel with the remaining series-arranged resistances.

5. In a motor-controller, the combination with a pair of motors, of two sets of resistances one for each motor, two pairs of terminals for each resistance said terminals being arranged in two sets, means for changing bridging connections between one set of said terminals whereby the motors may be placed in series and the resistances of each motor placed in series therewith or any number of said resistances paralleled with the remaining series-arranged resistances, the said bridging-changing means being such as to form bridging connections between the other set of resistance-terminals to parallel the motors and arrange the resistances of each motor in series therewith or any number of said resistances paralleled with the remaining series-arranged resistances.

6. In a motor-controller, the combination with a plurality of electrical resistances, of a pair of terminals for each of said resistances, a plurality of group of terminals, bridge-wires connecting certain of the terminals in each group, other bridge-wires connecting other terminals in each group with terminals of another group, and means for causing the resistance-terminals to contact with any group of the plurality of groups of terminals whereby the resistances may be arranged in series or any number of said resistances paralleled with the remaining series-arranged resistances.

7. In a motor-controller, a plurality of terminals arranged in vertical and horizontal groups, other terminals forming part of the group and extending entirely across the same in one direction, bridging-wires connecting certain terminals of each group in series, other bridging-wires connecting terminals of one group with terminals of another group, a plurality of resistances, a pair of terminals for each of said resistances and means for bringing the resistance-terminals into simultaneous engagement with any group of the plurality of terminals whereby, by changing the group in contact, the resistances may be arranged in series or any number of said resistances paralleled with the remaining series-arranged resistances.

8. In a motor-controller, the combination of a plurality of terminals arranged in vertical and horizontal groups, other terminals forming part of the group but extending through the same in one direction, bridging connections connecting certain terminals of the vertical groups in pairs, other bridging connections connecting certain of the terminals of the vertical groups with terminals of another vertical group, a pair of motors, a plurality of electrical resistances, a group of terminals consisting of a pair of terminals for each resistance, other terminals forming part of said group, a second and similar set of terminals some of which form a second pair of terminals for each of the resistances, and means for bringing one or the other of the groups of resistance-terminals in contact with any one of the vertical groups of terminals whereby the motors may be connected in series and certain of the resistances connected with the motors in series or any number thereof paralleled with the remaining series-arranged resistances, or the motors may be paralleled and certain of the resistances connected in series with each motor or any number of resistances paralleled with the remaining series-arranged resistances.

9. In a motor-controller, the combination, with a pair of motors and the feeder-circuits therefor, of two pairs of terminals each pair forming part of one of the motor-circuits and the two pairs being arranged in opposition to each other, a single switch-bar arranged between the two pairs of terminals and provided with means for bridging the terminals of each pair, the arrangement being such that the switch-bar when in its medial position will connect the terminals of each pair and when thrown to one side or the other of the medial position will connect the terminals of one pair or the other without the possibility of disconnecting the terminals of both pairs simultaneously.

10. In a motor-controller, the combination with a pair of motors, and the feeder-circuits therefor, of two pairs of terminals each pair forming part of one of the motor-circuits, and a switch arranged between the two pairs of terminals and adapted when in its medial position to bridge both pairs of terminals and when thrown to either side to disconnect one pair only of the terminals.

In witness whereof we have hereunto affixed our signatures in the presence of the witnesses herein named.

GEORGE E. KRAUSE.
ARTHUR L. BOLEN.

Witnesses:
H. N. WYATT,
A. J. BAILY.